United States Patent [19]

Nolley, Jr.

[11] 4,124,486
[45] Nov. 7, 1978

[54] CONVERSION OF ASPHALTENE-CONTAINING CHARGE STOCKS AND PRODUCT SEPARATION PROCESS

[75] Inventor: John P. Nolley, Jr., Glendale Heights, Ill.

[73] Assignee: UOP Inc., Des Plaines, Ill.

[21] Appl. No.: 833,331

[22] Filed: Sep. 14, 1977

[51] Int. Cl.$^2$ ............................................. C10G 37/02
[52] U.S. Cl. ...................................... 208/95; 208/309; 208/361; 208/364
[58] Field of Search ...................... 208/95, 251 H, 309, 208/321, 361, 364

[56] References Cited

U.S. PATENT DOCUMENTS

| | | | |
|---|---|---|---|
| 2,383,535 | 8/1945 | Dickinson et al. | 208/309 |
| 3,536,607 | 10/1970 | Borst | 208/251 H |
| 3,723,297 | 3/1973 | Gatsis et al. | 208/95 |
| 4,017,383 | 4/1977 | Beavon | 208/309 |

Primary Examiner—Herbert Levine
Attorney, Agent, or Firm—James R. Hoatson, Jr.; Robert W. Erickson; William H. Page, II

[57] ABSTRACT

A mixture of a hydrocarbon-selective solvent — e.g. isobutane — and deasphalted oil is separated in a two-stage hot-separator system at progressively higher temperatures and substantially the same pressure. Resulting vaporous phases are subjected to a cold-flash separation at a lower pressure and a considerably lower temperature. The initial hot separation, in the two-stage system, is effected at a temperature from about 1.0° F. to about 25° F. above the critical temperature of the solvent; the second is conducted at a temperature about 30° F. to about 130° F. above that in the initial hot-separation. This technique is especially advantageous when integrated into a catalytic slurry process for the conversion of metal- and asphaltene-containing hydrocarbonaceous black oils.

9 Claims, 1 Drawing Figure

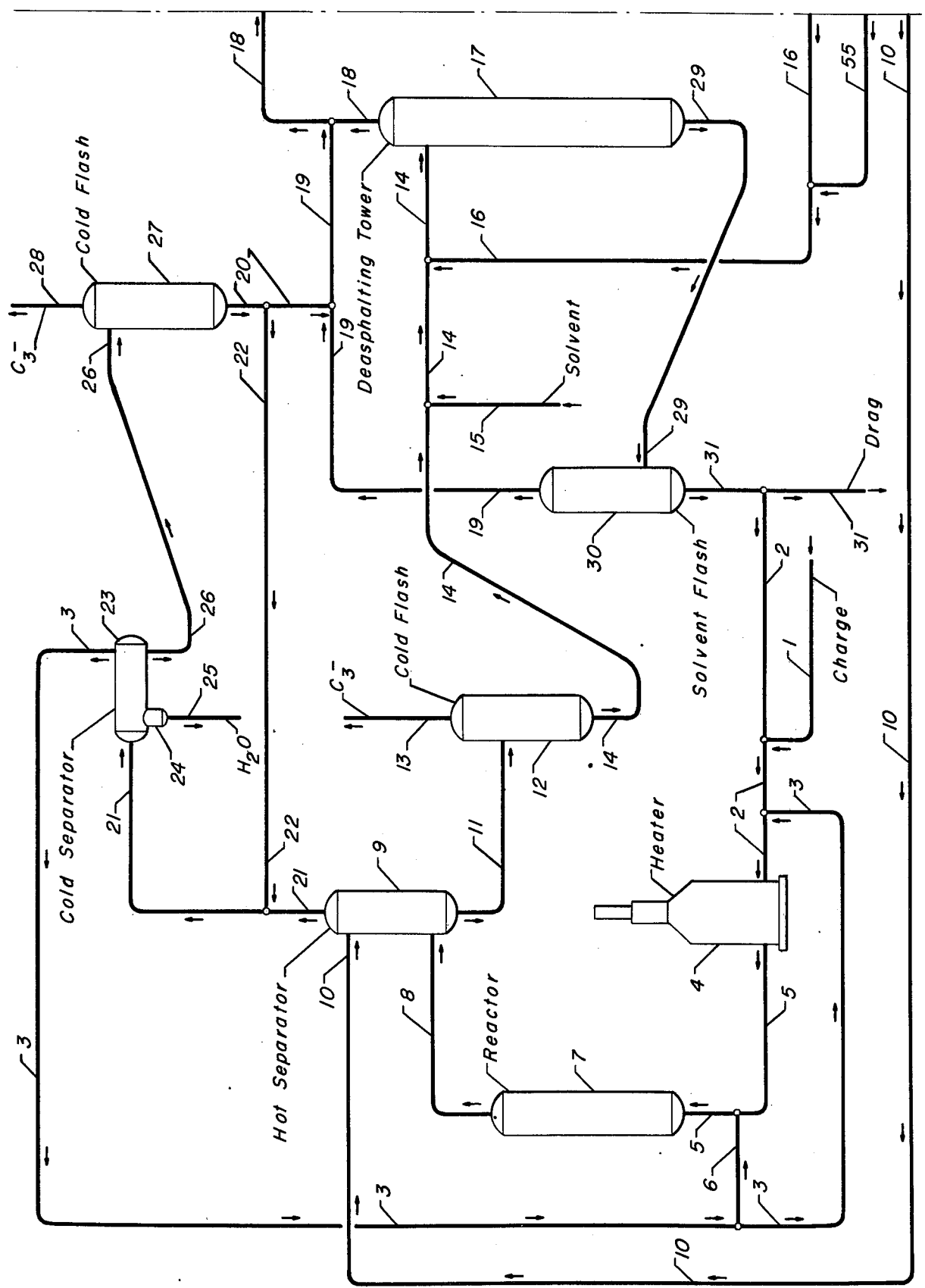

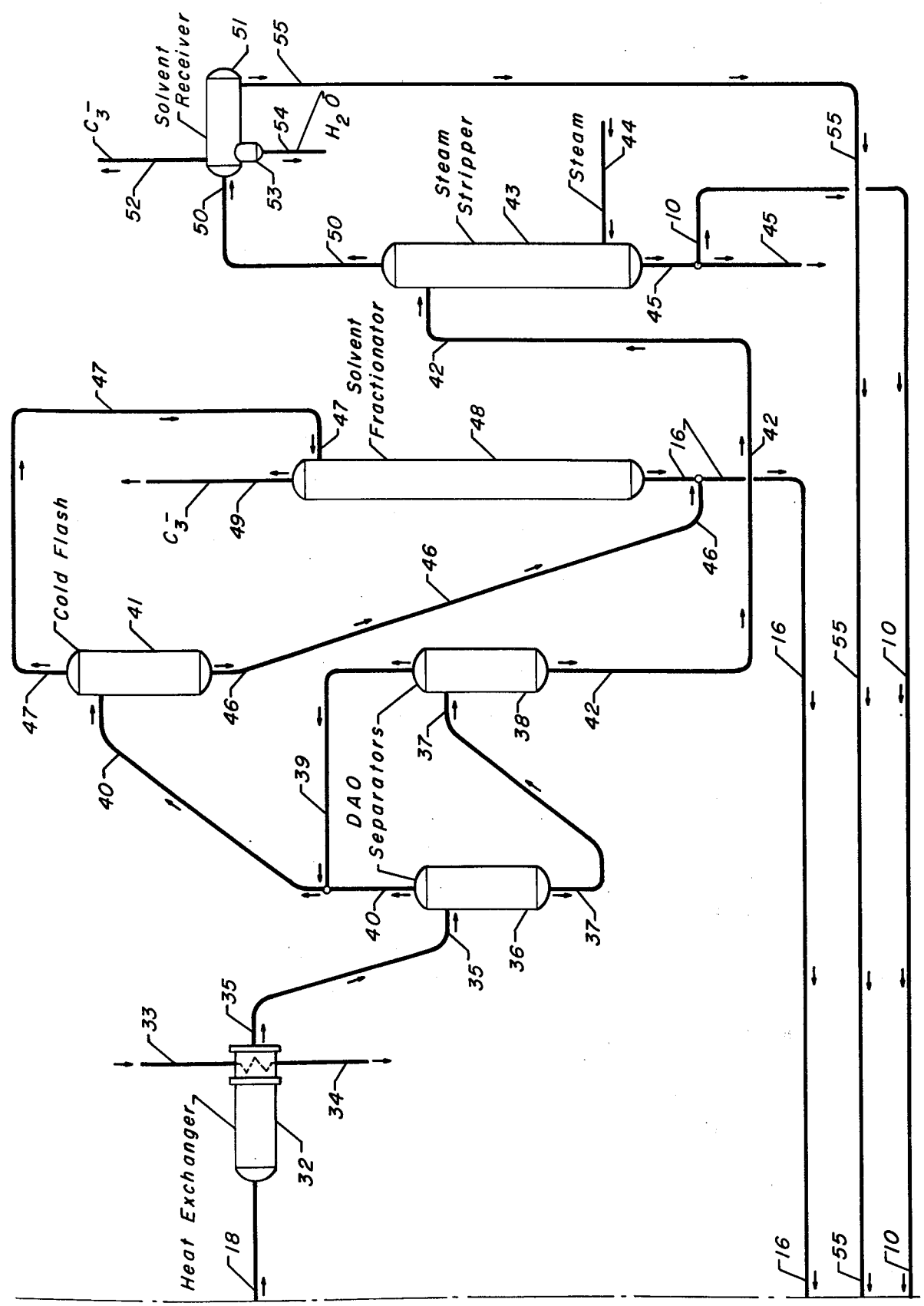

CONVERSION OF ASPHALTENE-CONTAINING CHARGE STOCKS AND PRODUCT SEPARATION PROCESS

APPLICABILITY OF INVENTION

The invention herein described is adaptable for the separation of the solvent-rich/deasphalted oil (DAO) phase resulting from solvent extraction employed to remove asphaltic material from heavy hydrocarbonaceous charge stocks. More particularly, the present invention is intended for integration into a combination process (catalytic slurry conversion and solvent deasphalting) for continuously converting atmospheric tower bottoms products, vacuum residuum, crude oil residuum, topped crude oils, coal oil extracts, oils extracted from tar sands, etc., all of which have come to be commonly referred to in the petroleum refining art as "black oils".

Black oils contain high molecular weight sulfurous and nitrogenous compounds in exceedingly large quantities, high molecular weight organometallic complexes principally comprising nickel and vanadium, and asphaltenic material. The latter is generally found to be complexed, or linked with sulfur and, to a certain extent, with the metal compounds. Abundant supplies of such hydrocarbonaceous material exists, most of which has a gravity less than about 20 °API; a significant quantity has a gravity less than 10 °API. Black oils are further characterized as having a boiling range where at least 10.0% by volume has a normal boiling point above a temperature of about 1050° F. One specific example of a black oil is a vacuum tower bottoms product having a gravity of 7.1 °API, containing 4.1% by weight of sulfur and 23.7% by weight of asphaltenes.

For some time knowledgeable experts have been predicting the onslaught of a world wide energy crisis. This involves ever-dwindling reserves of natural gas, compared to the increasing demand therefor, as well as the restrictions imposed upon the sulfur content of both liquid and solid fuels burned to meet certain energy requirements. Processes have been developed for conversion of naphtha and lighter hydrocarbon fractions into a substitute methane-rich natural gas. This in turn creates a shortage of naphtha as for ultimate use as motor fuel. Likewise, shortages of kerosine fractions, used principally as jet fuels, as well as gas oils exist as a result of the need to convert these materials into automotive fuels. A multitude of factors are, therefore, contributing to the developing energy crisis. As a result, innovative process technology (some of which is hereinafter specifically described) has been developed to insure the utilization of virtually 100.0% of the available reserve of petroleum crude oil charge stocks. Appropriate petroleum refining art commonly refers to this as converting the "bottom of the barrel".

As hereinafter described in the discussion of appropriate prior art, two processes are available for utilization in achieving close to 100% use of the hydrocarbonaceous black oils. One such process, solvent extractive distillation, or solvent deasphalting, is considered ancient as measured by current refining technology. The second is a catalytic slurry process which, once in operation, is virtually catalytically self-perpetuating as a result of the metallic compounds in the black oil charge stock. The various sulfides of such metals are known for their hydrocarbon conversion capabilities. Various combinations of these two processes have been described in the literature wherein at least a portion of the metallic sulfide-containing asphaltenic sludge is recycled to the catalytic reaction system from the solvent deasphalting system. Separation of the solvent/DAO mixture in accordance with my inventive concept, is intended to be integrated into any solvent deasphalting process as well as into the combination thereof with the aforementioned catalytic slurry conversion technique.

OBJECTS AND EMBODIMENTS

A principal object of the technique which is described herein is to improve the separation of a solvent-/DAO mixture emanating from the solvent extraction of hydrocarbonaceous black oils. A corrollary objective resides in effecting such separation with a considerable reduction in heat requirements.

A more specific object of my invention is to afford a more efficient combination process of catalytic slurry processing and solvent extraction for product separation.

Therefore, in one embodiment, the invention described herein encompasses a process for separating a mixture of a hydrocarbon-selective solvent and deasphalted oil which comprises the steps of: (a) introducing said mixture into a first separation zone, at superatmospheric pressure and a first temperature above the critical temperature of said solvent, to provide (i) a first solvent-rich vaporous phase and, (ii) a first solvent-lean liquid phase; (b) introducing said first phase into a second separation zone, at substantially the same pressure and a higher second temperature to provide (i) a second solvent-rich vaporous phase and, (ii) a second solvent-lean liquid phase; (c) introducing said first and second vaporous phases into a third separation zone, at a lower pressure and lower third temperature, (i) to recover a solvent concentrate and, (ii) to provide a solvent-lean vaporous phase; (d) separating said solvent-lean vaporous phase to remove hydrocarbons boiling below the boiling point of said solvent and to recover additional solvent concentrate; and, (e) stripping solvent from said second liquid phase to recover substantially solvent-free deasphalted oil.

In a more specific embodiment, the present invention directs itself toward a process for the conversion of an asphaltene-containing, hydrocarbonaceous black oil, and the recovery of deasphalted oil therefrom, which comprises the steps of: (a) reacting said black oil and hydrogen, in admixture with asphaltenes and a metallic suflide selected from the sulfides of the iron-group metals and the metals from Groups V-B and VI-B, in a reaction zone at conversion conditions selected to convert insoluble asphaltic material into lower-boiling hydrocarbons; (b) separating the resulting reaction product effluent, in a first separation zone, to provide (i) a hydrogen-rich first vaporous phase and, (ii) a first liquid phase, containing metallic sulfides and unreacted asphaltenes, and recycling at least a portion of said first vaporous phase to combine with said black oil; (c) separating said first liquid phase, in a second separation zone, at a lower temperature and pressure to provide (i) a second vaporous phase, containing normally gaseous hydrocarbons, and, (ii) a second liquid phase; (d) deasphalting said second liquid phase with hydrocarbon-selective solvent in a solvent extraction zone to provide (i) a solvent-rich third liquid phase, containing deasphalted oil, and, (ii) a solvent-lean mixture of unreacted asphaltenes and metallic sulfide; (e) separating said solvent-lean mixture, in a third separation zone, at substantially the same temperature and a lower pressure to provide (i) a solvent concentrated third vaporous phase and, (ii) a substantially solvent-free asphaltene/metallic sulfide mixture, and recycling at least a portion of said mixture to said reaction zone; (f) separating said solvent concentrate and said solvent-rich third liquid phase, in a fourth separation zone, at superatmospheric pressure and a first temperature above the critical temperature of said solvent, to provide (i) a solvent-rich fourth vaporous phase and, (ii) a solvent-lean fourth liquid phase; (g) separating said fourth liquid phase, in a fifth separation zone, at substantially the same pressure and a higher second temperature to provide a solvent-rich fifth vaporous phase and, a solvent-lean fifth liquid phase containing deasphalted oil; (h) introducing said fourth and fifth vaporous phases into a sixth separation zone, at a lower third temperature and a lower pressure, (i) to recover a substantially pure first solvent concentrate and, (ii) to provide a solvent-lean sixth vaporous phase, (i) separating said solvent-lean sixth vaporous phase to remove hydrocarbons boiling below the boiling point of said solvent and to recover an additional second solvent concentrate; and, (j) stripping solvent from said fifth liquid phase to recover substantially solvent-free deasphalted oil.

Other objects and embodiments will become evident, to those having the requisite skill in the appropriate art, from the following more detailed description of my invention. In one such other embodiment, the temperature in the first operation separation zone of the two-stage hot-flash system will be in the range of about 200° F. to about 540° F.

CITATION OF RELEVANT PRIOR ART

It must be recognized and acknowledged that the prior art abounds with a wide spectrum of techniques incorporated into the ancient process of solvent deasphalting (or solvent extraction) asphaltenic hydrocarbonaceous charge stocks. Likewise, a considerable amount of technology has been developed with respect to the catalytic slurry processing of hydrocarbonaceous black oils. In the interest of brevity, no attempt will be made herein to delineate exhaustively either the solvent deasphalting, or the slurry processing prior art. However, several illustrations of such prior art, including that directed toward combinations thereof, will be described briefly for the purpose of indicating the particular area to which my invention is intended to be applied. Copies of the prior art hereinbelow delineated accompany this application.

Broad concepts of solvent deasphalting are disclosed in U.S. Pat. No. 2,081,473 (Cl. 208-14) issued May 25, 1937. Preferred solvents are indicated as being liquefied normally gaseous hydrocarbons including methane, ethane, propane, butane and mixtures thereof. An aromatic hydrocarbon modifier is employed in U.S. Pat. No. 2,882,219 (Cl. 208-86).

U.S. Pat. No. 3,998,726 (Cl. 208-309) issued Dec. 21, 1976, is directed toward the variation of utilizing a solvent extraction zone adapted with direct heating in the upper section thereof, as contrasted to the indirect heat-exchange facilities previously employed. Suitable hydrocarbon-selective solvents are again light hydrocarbons including ethane, propane, butane, isobutane, pentane, isopentane, neopentane, hexene, isohexane, heptane, mono-olefinic counterparts thereof, etc.

With respect to catalytic slurry processing of hydrocarbonaceous black oils, U.S. Pat. No. 3,165,463 (Cl. 208-264) issued Jan. 12, 1965, directs itself toward the use of an unsupported organo-metallic catalyst in which the metal is selected from Group V-B, VI-B and the iron-group of the Periodic Table. The catalyst-containing sludge, including asphaltenes, is in part recycled to combine with the charge stock. Nickel and vanadium values in the recycled sludge portion will be converted to the sulfides thereof, and thus supply at least part of the catalytic action in the reaction zone. One of the more apparently successful processes is that encompassed by the technique disclosed in U.S. Pat. No. 3,558,474 (Cl. 208-108) issued Jan. 26, 1971. Here the charge stock is reacted with hydrogen in colloidal admixture with a non-stoichiometric vanadium sulfide catalyst. Also, up to about 90.0% of the catalyst- and asphaltene-containing sludge is recycled to combine with the fresh feed charge stock.

One combination of solvent deasphalting and catalytic slurry processing with an unsupported metal sulfide catalyst is shown in U.S. Pat. No. 3,723,294 (Cl. 208-86), issued Mar. 27, 1973. Here the charge stock, in admixture with the metal sulfide catalyst and the normally liquid portion of the effluent from the subsequent reaction zone, is first subjected to solvent deasphalting. The solvent-lean mixture of catalyst and precipitated asphaltic material is reacted with hydrogen to convert asphaltenes into lower-boiling hydrocarbon products. The solvent-rich, deasphalted oil-containing phase is introduced into a solvent recovery column from the bottom of which the DAO product and other distillables are recovered. Similarly, U.S. Pat. No. 3,723,297 (Cl. 208-95) issued Mar. 27, 1973 discloses the technique where the mixture of charge stock, asphaltenes and unsupported metal sulfide catalyst is first introduced into the reaction zone. Following separation of hydrogen, the product effluent passes into the deasphalting zone; again, the desired DAO product is recovered as a bottoms stream from the solvent recovery facility.

The foregoing is believed to be representative of the areas of petroleum refining to which my invention is intended to be applied. That is, any solvent deasphalting process as heretofore described in the prior art, and especially when integrated into a catalytic slurry process for the conversion of hydrocarbonaceous black oils. In essence, the technique herein disclosed is specifically directed toward the separation of the selected solvent and the deasphalted oil, the latter including hydrocarbons having normal boiling points within the naphtha boiling range as well as normally gaseous material boiling above the normal boiling point of the solvent. This particular technique is not found in the foregoing, either singularly, or taken collectively.

SUMMARY OF THE INVENTION

As hereinbefore stated, my inventive concept involves the separation of deasphalted oil from a mixture thereof with a hydrocarbon-selective solvent and hydrocarbons having normal boiling points below that of the solvent. The solvent/DAO mixture, recovered following asphaltic precipitation in the solvent extraction vessel, is introduced into a first separation zone which functions at substantially the same pressure as the deasphalting tower, and at a temperature above the critical temperature of the solvent. This produces a first solvent-rich vaporous phase and a first solvent-lean deasphalted phase. The latter is increased in temperature and introduced into a second separation zone, again at substantially the same pressure, which provides a second solvent-rich vaporous phase and a second solvent-lean normally liquid phase. The first and second solvent-rich vaporous phases are combined and a solvent concentrate, substantially free from lower-boiling hydrocarbons is recovered therefrom. Any solvent remaining in the DAO concentrated liquid phase is removed therefrom by the relatively simple technique of stripping (generally employing steam as the stripping medium). This separation technique is herein referred to as a two-stage hot-separator system, and is in contrast to the commonly practiced scheme which utilizes a single hot separator having attendant therewith an external reboiler. In the latter type of operation, a portion of the bottoms liquid phase is introduced into the reboiler and at least partially vaporized therein. These vapors are then re-introduced into the single separation zone and are thus admixed with the liquid phase therein. In accordance with the present two-stage system, there is no such re-mixing of the second vaporous phase with a liquid phase. The principal advantage over the current technique resides in energy conservation expressed as necessary heat input (BTU/hr) to achieve the desired separation; in one specific illustration, this amounts to approximately 24.0%. This savings stems from the fact that specific heat is not put into the vapor phase; that is, about 40.0% of the heat is needed at a lower temperature level.

As employed above, as well as in the further description of the present invention, the term "substantially the same pressure" is intended to connote that the pressure imposed upon a downstream vessel is the same as that imposed upon the vessel immediately upstream, allowing only for the normal pressure drop experienced as a result of fluid flow through the system. Similarly, the term "substantially the same temperature" is employed to indicate that no intentional or heating or cooling is effected between vessels, with the downstream vessel functioning at that temperature resulting only from temperature drop in transferring a given stream between vessels.

Separation of the solvent/DAO mixture in accordance with the foregoing, does not depend upon the use of a particular solvent in the solvent extraction zone in which the asphaltics are precipitated. Thus, any of the hydrocarbon-selective solvents described heretofore may form the mixture with deasphalted oil. Preferred solvents are light hydrocarbons — principally paraffins and mono-olefins — having from three to about seven carbon atoms per molecule. Especially preferred are those paraffinic hydrocarbons having three to five carbon atoms per molecule. Contemplated, therefore, are propane, isobutane, n-butane, isopentane, n-pentane, n-hexane, isoheptane, n-heptane, mixtures and the mono-olefinic counterparts thereof. Since propane has a critical temperature of about 200° F., and isoheptane a critical temperature of about 513° F., the first stage will function at a temperature within the range of about 200° F. to about 540° F., and about 1.0° F. to about 25° F. above the critical temperature of the selected solvent. The second stage separation, in the two-stage system, is effected at a temperature about 30° F. to about 130° F. above that temperature in the initial hot-flash. Since the preferred solvents contain from three to five carbon atoms per molecule, the initial stage will function at a temperature of about 200° F. to about 410° F. Particularly preferred solvents are isobutane, isopentane, a mixture of normal butane and isopentane, and a mixture of propane with normal butane.

The solvent extraction zone will function at temperatures in the range of about 50° F. to about 600° F., and preferably from about 100° F. to about 400° F.; the pressure will be maintained within the range of about 100 to about 1,000 psig., and preferably from about 200 to about 650 psig. The solvent/charge stock volumetric ratio will most generally range from 2.0:1.0 to about 30.0:1.0, and preferably from about 3.0:1.0 to about 10.0:1.0. Depending upon the precise character of the solvent, judicious procedures dictate the selection of temperature and pressure to maintain the extraction operation in liquid phase.

As hereinbefore stated, asphaltenic black oils appear to be more susceptible to conversion into lower-boiling hydrocarbons when the reactions are effected in a catalytic slurry operation. Although many organo-metallic compounds, selected from the metals of Groups V-B, VI-B and the Iron-Group, have been suggested in the multitudinous prior art, it would appear that a preference exists for the unsupported sulfides of these metals, and that more advantageous results are afforded through their use. These include the sulfides of vanadium, niobium, tantalum, molybdenum, tungsten, chromium, iron, cobalt, nickel and mixtures thereof. Of these, nickel and vanadium are preferred in view of the fact that these metals make up the greater proportion of all the metals found in hydrocarbonaceous black oils. Since these virgin metals are sulfided during the asphaltene conversion, and a portion of the asphaltic, metal sulfide-containing sludge is recycled from the deasphalting tower to the reaction zone, the process is catalytically self-sustaining.

The black oil charge stock is admixed with finely-divided metal sulfide catalyst particles, hydrogen and hydrogen sulfide, increased in temperature to a level in the range of about 550° F. to about 1,000° F. Hydrogen concentrations are generally in the range of about 1,000 to about 50,000 scf/bbl of fresh charge stock, and preferably from about 5,000 to about 20,000 scf/bbl. The catalyst concentration is in the range of about 1.0% to about 25.0% by weight, and preferably from about 2.0% to about 15.0% by weight, calculated as the elemental metal, or metals. Hydrogen sulfide is present in an amount of about 1.0% to about 15.0% on a mole basis with hydrogen. The heated reactant stream mixture is introduced, preferably in upward flow, into the reaction chamber which is maintained under an imposed pressure in the range of about 500 to about 4,000 psig., and preferably from about 1,000 to about 3,000 psig. Residence time in the reaction chamber depends upon a multitude of considerations not the least of which involves operating severity, the degree of mixing within the chamber, catalyst concentration, charge stock characteristics (both chemical and physical), the desired conversion and the ratio of recycled material to fresh feed. In most applications, the residence time will range from about 30 seconds to two hours.

The further description of the separation technique of the present invention, and its relation to solvent deasphalting and a combination thereof with catalytic slurry conversion of a hydrocarbonaceous black oil, will be made in conjunction with and reference to the accompanying drawing. This is presented solely for the purpose of additional explanation and clarification, and is not intended to be limiting upon the scope and spirit of my invention as set forth in the appended claims.

BRIEF DESCRIPTION OF DRAWING

Briefly referring now to the accompanying drawing, which illustrates several embodiments of the present invention, the integrated process is presented by way of a simplified diagrammatic flow diagram. Many details including pumps, instrumentation and controls, heat-exchange and heat-recovery circuits, start-up lines, compressors, condensers, valving and similar hardware have been eliminated, or reduced in number as not being essential to an understanding of the techniques involved. The utilization of these miscellaneous appurtenances, for the purpose of modifying the process, is well within the purview of those possessing the requisite expertise in the appropriate technology. The two-stage, hot-separator system for separating the DAO from the solvent is illustrated as DAO separators 36 and 38. Catalytic slurry conversion of the black oil is effected in reaction chamber 7, solvent extraction takes place in deasphalting tower 17 and the DAO product is recovered from steam stripper 43 through conduit 45.

The detailed description which follows will be made in conjunction with a commercially-sized unit designed to process about 25,000 Bbl/day of residue having a gravity of about 9.7 °API and an average molecular weight of about 670. Contaminants include 3.05% by weight of sulfur, about 0.60% by weight of nitrogen, 54 ppm. of nickel by weight and 610 ppm. of vanadium by weight. The initial boiling point is about 940° F., and 1,062° F. is the 20.0% volumetric distillation temperature. For the sake of illustration, the hydrocarbon-selective solvent will be isobutane, the critical temperature of which is about 275° F.

DETAILED DESCRIPTION OF DRAWING

Specifically referring now to the drawing, for the sake of simplification the numerical values of the various streams and components thereof will be given in moles per hour. Furthermore, since the selected solvent is isobutane, the "light ends" rejected as off-gas will consist of those normally gaseous components which have lower normal boiling points; similarly, the DAO product will be considered to include all hydrocarbons having higher normal boiling points. The black oil charge stock is introduced into the process by way of line 1, in an amount of about 546.71 moles/hr., in slurry admixture with about 5.0% by weight of finely-divided vanadium sulfide, calculated as elemental vanadium. As previously stated, the process ultimately becomes self-sustaining with respect to the catalytically-active metallic sulfides. Therefore, the addition of "fresh" catalyst will gradually decrease, to be subsequently added periodically only as the need arises. Make-up hydrogen (about 96.0%) is added to the charge in an amount of about 2617.35 moles/hr., as is hydrogen sulfide in the amount of 234.96 moles/hr. (about 2.2% by weight).

The resulting mixture is commingled with an asphaltic, metal sulfide-containing recycle in line 2, in the amount of about 150.28 moles/hr. (about 130,000 lbs/hr.), and a hydrogen-rich recycled vaporous phase, in the amount of 31,212.46 moles/hr., from line 3. Based only upon the fresh feed charge and the asphaltic recycle, the hydrogen/hydrocarbon mole ratio approximates 37.0:1.0. The total combined feed continues through line 2 into a heat exchanger (not illustrated) and direct-fired heater 4, in which heating circuit the temperature is increased to about 750° F. The thus-heated reactant stream, having the component analysis shown in the following Table I, passes through line 5 into slurry reaction zone 7 maintained at a pressure of about 2,000 psig. Where required for temperature control, a portion of the hydrogen-rich recycled stream in line 3 may be diverted through line 6, thereby bypassing heater 4; in this illustrative example, this bypass stream is not being used.

TABLE I

| Component | Combined Feed to Reactor Moles/Hr. |
|---|---|
| Water | 27.48 |
| Hydrogen Sulfide | 4,122.75 |
| Hydrogen | 24,539.62 |
| Light Ends | 5,201.14 |
| Isobutane Solvent | 207.45 |
| Charge Stock | 546.71 |
| Asphaltics | 116.66 |

Reaction product effluent, in the total amount of 33,015.84 moles/hr., is withdrawn from reactor 7 through conduit 8 at a temperature of about 800° F. and a pressure of about 2,000 psig. The total effluent, at substantially the same temperature and pressure, is introduced into hot separator 9. In the following Table II, component analyses of the reactor product effluent and the reactor production (change from the combined feed stream) are presented. A DAO concentrate, from a source hereinafter described, is also introduced into hot separator 9, in the amount of about 10.0 moles/hr., via line 10. This serves as a wash oil to clean a demister blanket disposed in the hot separator; the quantity is not included in the numerical values presented in Table II.

TABLE II

| Component, Moles/Hr. | Reactor Effluent and Production | |
|---|---|---|
| | Effluent | Production |
| Water | 45.95 | 18.47 |
| Hydrogen Sulfide | 4,248.66 | 125.91 |
| Hydrogen | 22,350.48 | −2,189.14 |
| Light Ends | 5,345.54 | 144.39 |
| Isobutane Solvent | 207.45 | — |
| Charge Stock | — | −546.71 |
| DAO | 698.54 | 698.54 |
| Asphaltics | 119.24 | 2.58 |

With respect to the asphaltics concentrations in Table II, the apparent "gain" of 2.68 moles/hr. may appear misleading; however, this amount represents the unconverted asphaltenic material originally present in the charge stock.

Hot separator 9 serves to provide a hydrogen-rich vaporous phase in line 21, 31,894.88 moles/hr., inclusive of the wash oil in line 10, containing about 119.07 moles of DAO, and a liquid phase comprising about 51.9 mole percent DAO, withdrawn through conduit 11. The vaporous phase is admixed with about 500.0 moles/hr. of a DAO concentrated sponge oil from line 22, cooled and condensed to a temperature in the range of about 60° F. to 140° F. — e.g. 130° F. — and is introduced into cold separator 23 at a pressure approximating 2,000 psig. A hydrogen-rich vaporous phase is recovered by way of line 3, and recycled to combine with the reactor feed in line 2; of the 3,212.46 moles/hr. so recycled, about 70.4% constitutes hydrogen. About 333 lbs/hr. of water are removed from boot 24 by way of line 25. A principally liquid phase, comprising about 4.6 mole percent isobutane solvent and about 43.1% DAO, is withdrawn through line 26, and introduced thereby into cold flash zone 27 at a pressure of about 550 psig. and a corresponding temperature of about 300° F. Light ends, including hydrogen, hydrogen sulfide, methane, ethane and propane, are withdrawn by way of line 28 in the amount of about 504.22 moles/hr. This stream contains about 3.6 mole percent isobutane; as hereinafter set forth, this and other "light end" streams may be processed in suitable depropanizing facilities to recover the isobutane solvent. A DAO concentrate, 76.1% of 659.69 moles/hr., is withdrawn from cold flash zone 27 by way of line 20, of which 500.0 moles/hr. are diverted through line 22 to serve as a sponge oil in cold separator 23.

The liquid phase from hot separator 9 is introduced, via line 11, into cold flash zone 12 at a temperature of about 300° F. and a pressure of about 550 psig. This stream, in the amount of about 1,130.94 moles/hr., contains the metallic sulfide catalyst, about 119.24 moles of asphaltics, 587.03 moles of DAO and about 48.1 mole percent of isobutane solvent, light ends, hydrogen and hydrogen sulfide. The function served by cold flash zone 12 is to reject normally gaseous material boiling below the boiling point of the isobutane solvent while simultaneously providing a normally liquid DAO concentrate; the former is withdrawn via line 13 (containing 0.8 mole percent of isobutane) in the amount of about 325.4 moles/hr. The DAO concentrate, in the amount of about 805.54 moles/hr. is recovered via conduit 14. This stream contains the catalytically active metallic sulfides and the asphaltenes; a component analysis is presented in Table III.

TABLE III

| DAO Concentrate Analysis | |
|---|---|
| Component | Moles/Hr. |
| Water | — |
| Hydrogen Sulfide | 24.10 |
| Hydrogen | 46.29 |
| Light Ends | 24.76 |
| Isobutane Solvent | 4.19 |
| DAO | 586.96 |
| Asphaltics | 119.24 |

As above stated, the light ends in stream 13 may be combined with other such streams emanating from the illustrated process for introduction into separation facilities for the removal of hydrogen and hydrogen sulfide, and the recovery of isobutane solvent and the light end hydrocarbons, methane, ethane and propane.

The DAO concentrate in line 14 is admixed with about 64.39 moles/hr. of make-up isobutane solvent from line 15, and a recovered solvent-rich stream from line 16. The latter is a mixture of 7,245.64 moles/hr. of solvent-rich material from cold flash zone 41 (line 46), 7,082.07 moles/hr. of a bottoms stream from solvent fractionator 48 (line 16) and about 612.59 moles/hr. from solvent receiver 51 (line 55). These combined streams comprise about 99.4 mole percent isobutane solvent, and continue through conduit 14 into solvent extraction, or deasphalting tower 17. Deasphalting tower 17 functions at a pressure of about 600 psig. and a temperature of about 260° F. Precipitated asphaltics are recovered in a solvent-lean phase through conduit 29, and the DAO product in line 18 in a solvent-rich phase. Component analyses of these streams are presented in Table IV.

TABLE IV

| Deasphalting Tower Stream Analyses | | |
|---|---|---|
| Component, Moles/Hr. | Line 18 | Line 29 |
| Water | — | — |
| Hydrogen Sulfide | 76.26 | 6.06 |

TABLE IV-continued

| Deasphalting Tower Stream Analyses | | |
|---|---|---|
| Component, Moles/Hr. | Line 18 | Line 29 |
| Hydrogen | 92.72 | 7.37 |
| Light Ends | 55.82 | 4.44 |
| Isobutane Solvent | 14,844.55 | 1,180.20 |
| DAO | 587.29 | — |
| Asphaltics | — | 119.24 |

The bottoms stream from solvent extraction zone 17 is passed via line 29 into solvent flash zone 30 at a pressure of about 200 psig. and a temperature of about 250° F., which is substantially the same temperature at which extraction tower 17 functions. About 153.61 moles/hr. of a concentrated asphaltic stream is recovered through conduit 31; of this, about 150.28 moles, containing 33.48 moles of isobutane, are diverted through line 2 for recycle to reaction zone 7. The remaining 3.33 moles, containing 0.74 moles of solvent, are withdrawn from the process through line 31. Asphaltic removal amounts to about 2.2 percent, and serves to prevent excessive metal build-up in the slurry reaction zone. In contrast, the asphaltic, containing metal sulfides, maintains the catalyst activity in the reaction zone and creates a catalytically self-sustaining process. A solvent-rich concentrate is recovered via line 19 in the amount of about 1,163.70 moles/hr. (95.5% isobutane solvent).

Although the isobutane solvent stream from solvent flash zone 30 may be recycled to deasphalting tower 17, in admixture with stream 14, the illustrated alternative combines this stream with that portion of cold flash bottoms (line 20), not recycled to cold separator 23, and the solvent-rich DAO phase in line 18, the mixture continuing through conduit 18 into heat-exchanger 32. The heat-exchange medium, entering through line 33 and exiting via conduit 34, may be any suitable, hotter internal process stream. Since the critical temperature of the isobutane solvent is about 275° F., the temperature of the mixed stream in line 18 is increased about 1.0° F. to about 25° F., or to a level in the range of about 276° F. to about 300° F. — i.e. 297° F. A component analysis of the isobutane solvent/DAO mixture is given in Table V.

TABLE V

| Solvent/DAO Mixture Analysis | |
|---|---|
| Component | Moles/Hr. |
| Water | — |
| Hydrogen Sulfide | 99.98 |
| Hydrogen | 92.89 |
| Light Ends | 61.65 |
| Isobutane Solvent | 14,853.05 |
| Deasphalted Oil | 708.74 |

The solvent/DAO mixture, at a temperature of about 277° F. is introduced via line 35 into DAO separator 36 under a pressure of about 600 psig. The liquid phase in line 37 is increased in temperature about 30° F. to about 130° F., or to a level in the range of about 307° F. to about 407° F. — e.g. about 385° F. — and introduced into DAO separator 38 at substantially the same pressure of about 600 psig. The two principally vaporous phases in lines 40 and 39 are combined (a total of 14,491.29 moles/hr.) and introduced through line 40 into cold flash zone 41 at a pressure of about 45 psig. and a temperature in the range of about 60° F. to about 140° F. — e.g. 125° F. The DAO concentrate is withdrawn from DAO separator 38 through conduit 42, in the amount of about 1,325.01 moles/hr. A component analysis of the separated vaporous and liquid streams is presented in Table VI.

TABLE VI

| | Solvent/DAO Separation Analyses | |
|---|---|---|
| Component, Moles/Hr. | Line 40 | Line 42 |
| Water | — | — |
| Hydrogen Sulfide | 99.27 | 0.71 |
| Hydrogen | 92.86 | 0.03 |
| Light Ends | 61.19 | 0.45 |
| Isobutane Solvent | 14,237.64 | 615.40 |
| DAO | 0.34 | 708.42 |

Utilizing the two hot-separator system as above set forth requires heat input, from the heat-exchange medium employed, of about $278 \times 10^6$ BTU/hr. at the outlet temperature of 385° F. for the DAO concentrate in line 42. This constitutes a considerable energy savings and economic advantages over the single zone system which requires about $363 \times 10^6$ BTU/hr. at the same outlet temperature.

The overhead stream from cold flash zone 41, in the amount of about 7,245.64 moles/hr., is withdrawn via line 47 and introduced thereby into solvent fractionator 48 at a temperature of about 250° F. and a pressure of about 400 psig. The remainder of the cold flash zone feed is recovered as a bottoms stream in line 46. Additional light ends, including hydrogen, hydrogen sulfide and some isobutane solvent are removed as an overhead stream from solvent fractionator 48, via line 49 in the amount of about 163.57 moles/hr. The bottoms stream is withdrawn through line 16, in the amount of about 7,082.07 moles/hr., combined with the bottoms stream from cold flash zone 41 and recycled therewith to deasphalter 17.

The DAO concentrate from DAO separator 38 is introduced into steam stripper 43 via line 42; about 613.16 moles/hr. of 30 psig. steam, at a temperature of about 600° F., is introduced into the lower end of the stripper through conduit 44. Principal functions of the steam stripper are to remove light ends and isobutane solvent from the DAO, and to recover a substantially solvent-free DAO. About 712.41 moles/hr., containing about 4.0 moles of solvent are recovered through line 45. Of this amount, about 10.0 moles/hr. are diverted through line 10 for use as a demister wash oil in hot separator 9. The remaining 702.41 moles/hr. are recovered as the DAO product. A solvent-rich stream, 611.4 moles/hr. of isobutane, is recovered in line 50, in admixture with 613.16 moles/hr. of water and 1.19 moles/hr. of light ends. This stream is introduced into solvent receiver 51 which functions at substantially the same pressure and a temperature in the range of 60° F. to about 140° F. Water, in the amount of 613.16 moles/hr. is removed from water boot 53 via line 54, and the 1.19 moles/hr. of light ends by way of line 52. The isobutane solvent is recovered through conduit 55 and recycled, via line 16, into solvent extraction zone 17.

The 702.41 moles/hr. of DAO product contains only 3.94 moles of the isobutane solvent. It contains only about 14 ppm. by weight of metals and 1.97% by weight of sulfur. The gravity is about 18.4 °API and its average molecular weight has been lowered to about 512.7. Based upon the fresh feed charge rate of 25,000 Bbl/day (365,538 lbs/hr.), product is recovered in the amount of 26,140 Bbl/day (360,108 lbs/hr.), or a volumetric increase of about 4.5%. In the claims which follow, for understanding and clarity, the parenthesized arabic numerals refer to vessel and stream designations in the accompanying drawing.

The foregoing clearly demonstrates the method of effecting the present invention and the benefits afforded through its use in the catalytic slurry conversion of hydrocarbonaceous black oils.

I claim as my invention:

1. A process for separating a mixture of a hydrocarbon-selective solvent comprising a light hydrocarbon having from about 3 to about 7 carbon atoms per molecule and deasphalted oil which comprises the sequential steps of:
   (a) introducing said mixture into a first separation zone, at superatmospheric pressure and a first temperature above the critical temperature of said solvent, to provide (i) a first solvent-rich vaporous phase, and, (ii) a first solvent-lean liquid phase;
   (b) introducing said first liquid phase into a second separation zone, at substantially the same pressure and a higher second temperature to provide (i) a second solvent-rich vaporous phase and, (ii) a second solvent-lean liquid phase;
   (c) introducing said first and second vaporous phases into a third separation zone, at a lower pressure and lower third temperature, (i) to recover a solvent concentrate and, (ii) to provide a solvent-lean vaporous phase;
   (d) distilling said solvent-lean vaporous phase to remove hydrocarbons boiling below the boiling point of said solvent and to recover additional solvent concentrate; and,
   (e) stripping solvent from said second liquid phase to recover substantially solvent-free deasphalted oil.

2. The process of claim 1 further characterized in that said first temperature is in the range of about 200° F to about 540° F.

3. The process of claim 1 further characterized in that said solvent is a mixture of normal butane and isopentane.

4. The process of claim 1 further characterized in that said solvent is a mixture of propane and normal butane.

5. The process of claim 1 further characterized in that said solvent is isopentane.

6. The process of claim 3 further characterized in that said first temperature is in the range of about 200° F. to about 410° F.

7. A process for the conversion of an asphaltene-containing, hydrocarbonaceous black oil, and the recovery of deasphalted oil therefrom, which comprises the sequential steps of:
   (a) reacting said black oil and hydrogen, in admixture with asphaltenes and a metallic sulfide selected from the sulfides of the iron-group metals and the metals from Groups V-B and VI-B, in a reaction zone at conversion conditions selected to convert insoluble asphaltic material into lower-boiling hydrocarbons;
   (b) separating the resulting reaction product effluent, in a first separation zone, to provide (i) a hydrogen-rich first vaporous phase and, (ii) a first liquid phase, containing metallic sulfides and unreacted asphaltenes, and recycling at least a portion of said first vaporous phase to combine with said black oil;
   (c) separating said first liquid phase, in a second separation zone, at a lower temperature and pressure to provide (i) a second vaporous phase, containing normally gaseous hydrocarbons, and, (ii) a second liquid phase;

(d) deasphalting said second liquid phase with a hydrocarbon-selective solvent comprising a light hydrocarbon having from about 3 to about 7 carbon atoms per molecule in a solvent extraction zone to provide (i) a solvent-rich third liquid phase, containing deasphalted oil, and, (ii) a solvent-lean mixture of unreacted asphaltenes and metallic sulfides;

(e) separsting said solvent-lean mixture, in a third separation zone, at substantially the same temperature and a lower pressure to provide (i) a solvent concentrated third vaporous phase and, (ii) a substantially solvent-free asphaltene/metallic sulfide mixture, and recycling at least a portion of said mixture to said reaction zone;

(f) separating said solvent concentrate and said solvent-rich third liquid phase, in a fourth separation zone, at superatmospheric pressure and a first temperature above the critical temperature of said solvent, to provide (i) a solvent-rich fourth vaporous phase and, (ii) a solvent-lean fourth liquid phase;

(g) separating said fourth liquid phase, in a fifth separation zone at substantially the same pressure and a higher second temperature to provide a solvent-rich fifth vaporous phase and, a solvent-lean fifth liquid phase containing deasphalted oil;

(h) introducing said fourth and fifth vaporous phases into a sixth separation zone, at a lower third temperature and a lower pressure, (i) to recover a substantially pure first solvent concentrate and, (ii) to provide a solvent-lean sixth vaporous phase;

(i) distilling said solvent-lean sixth vaporous phase to remove hydrocarbons boiling below the boiling point of said solvent and to recover an additional second solvent concentrate; and, (j) stripping solvent from said fifth liquid phase to recover substantially solvent-free deasphalted oil.

8. The process of claim 7 further characterized in that said first and second solvent concentrates are introduced into said solvent extraction zone.

9. The process of claim 7 further characterized in that said first vaporous phase is separated, at substantially the same pressure and a temperature in the range of about 60° F. to about 140° F., to remove normally vaporous hydrocarbons and to increase the hydrogen concentration prior to recycling a portion thereof to combine with said black oil.

* * * * *